Feb. 16, 1954   J. L. SMITH   2,669,263
WORK RETURN MECHANISM FOR RIP SAWS
Filed Dec. 21, 1951   3 Sheets-Sheet 1
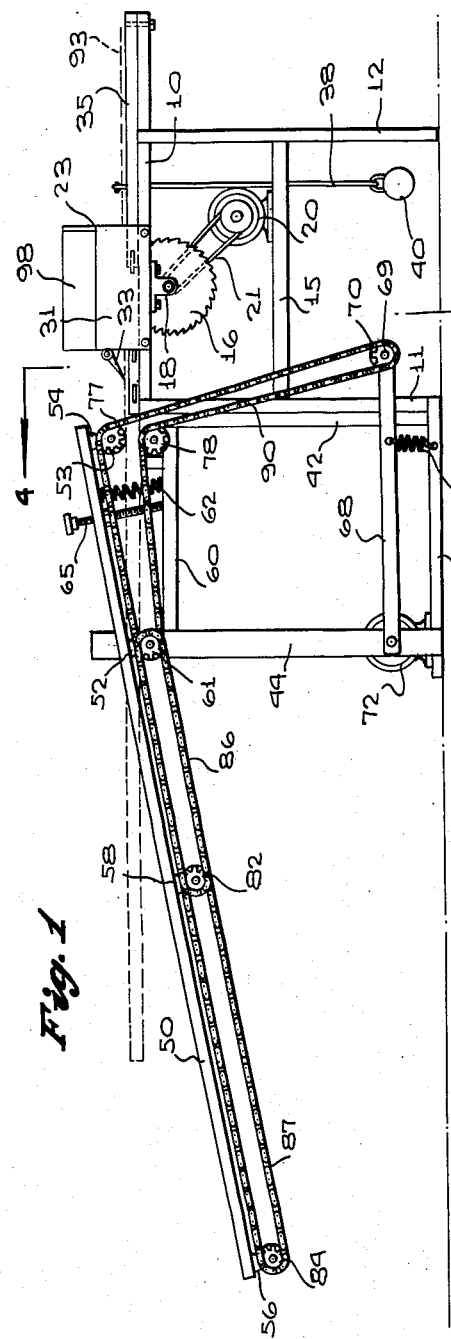
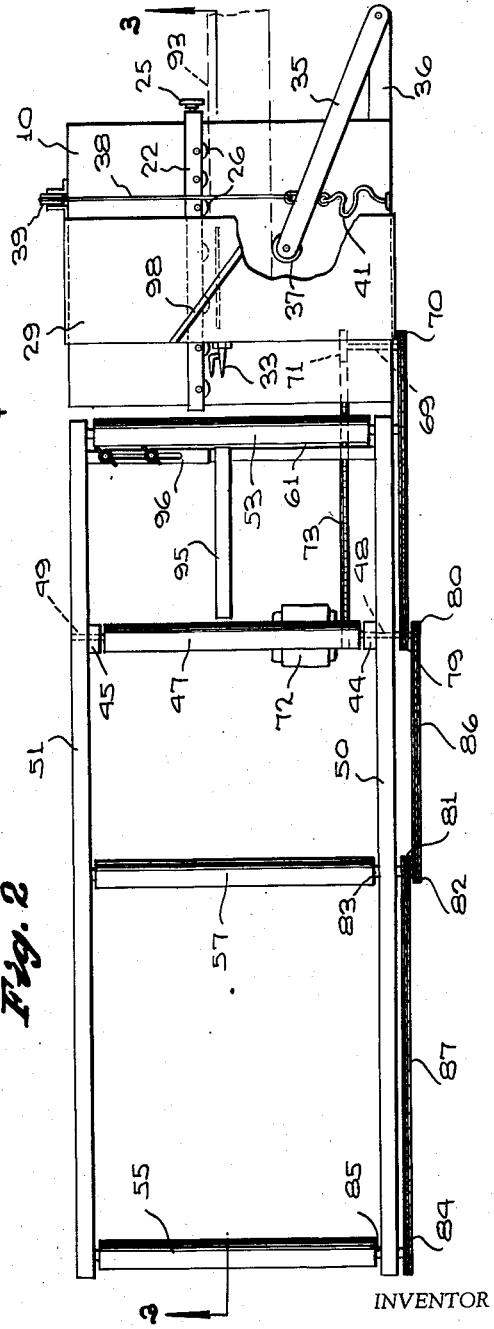
INVENTOR
JAMES L. SMITH
BY
McMorrow, Berman + Davidson
ATTORNEYS Feb. 16, 1954  J. L. SMITH  2,669,263
WORK RETURN MECHANISM FOR RIP SAWS
Filed Dec. 21, 1951  3 Sheets-Sheet 2
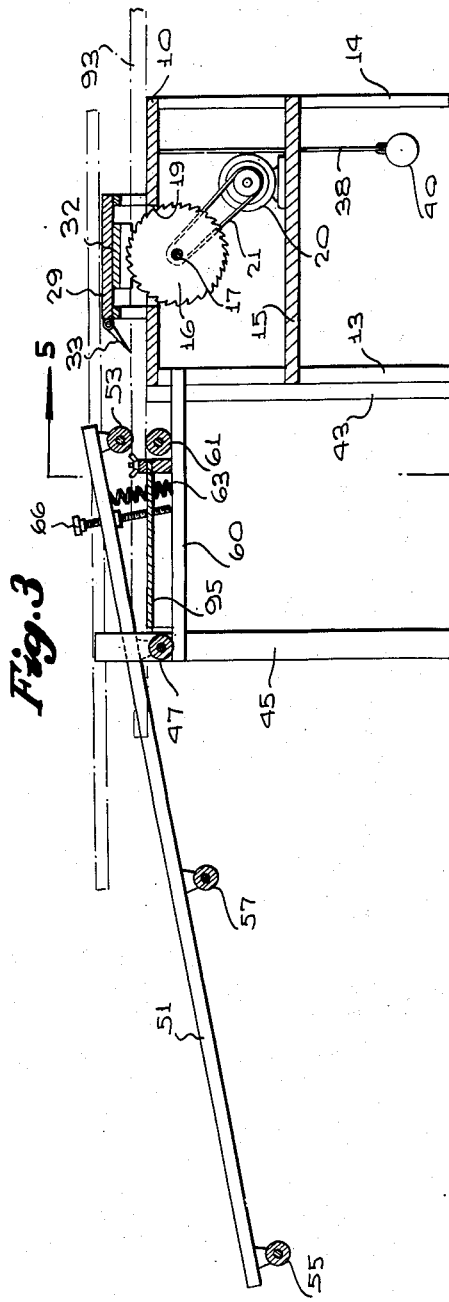
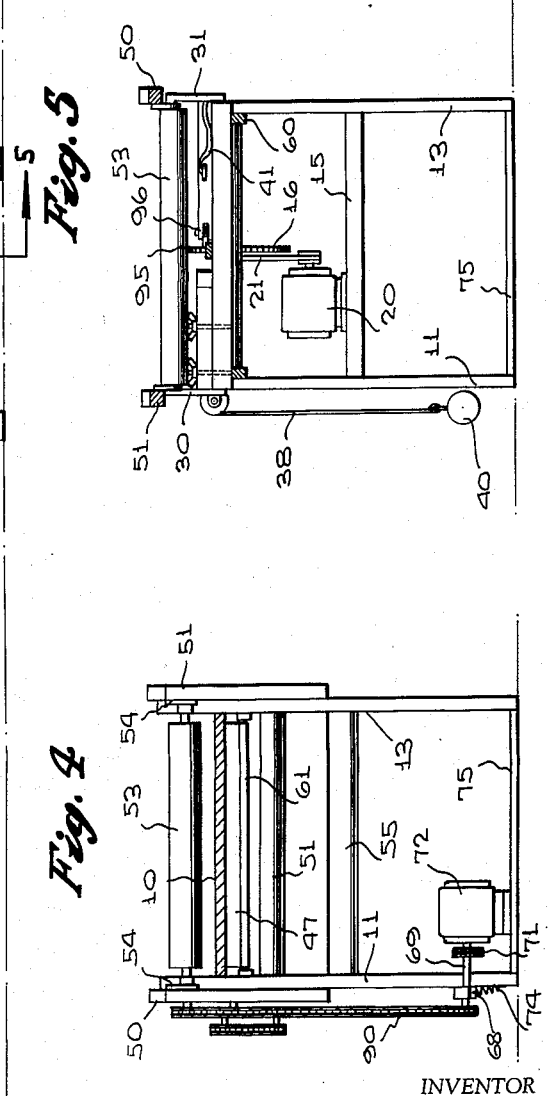
INVENTOR
JAMES L. SMITH
BY
McMorrow, Berman + Davidson
ATTORNEYS Feb. 16, 1954   J. L. SMITH   2,669,263
WORK RETURN MECHANISM FOR RIP SAWS
Filed Dec. 21, 1951   3 Sheets-Sheet 3
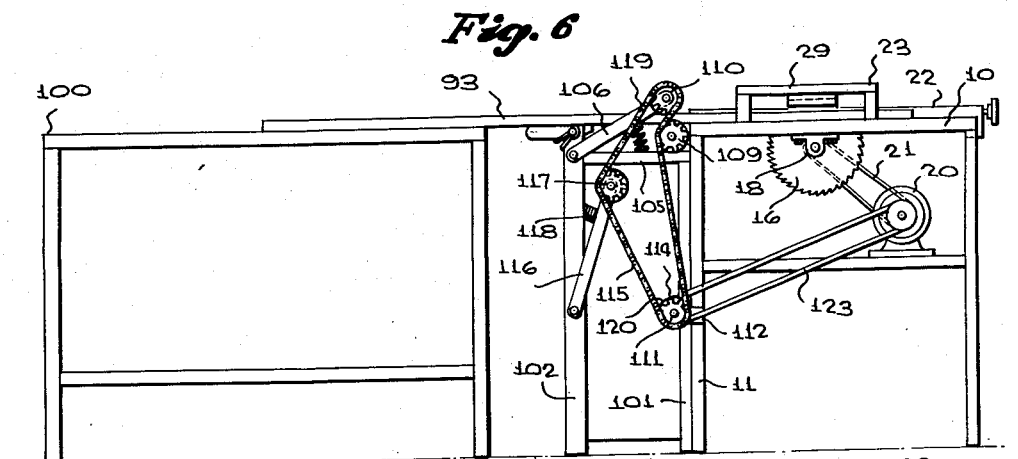
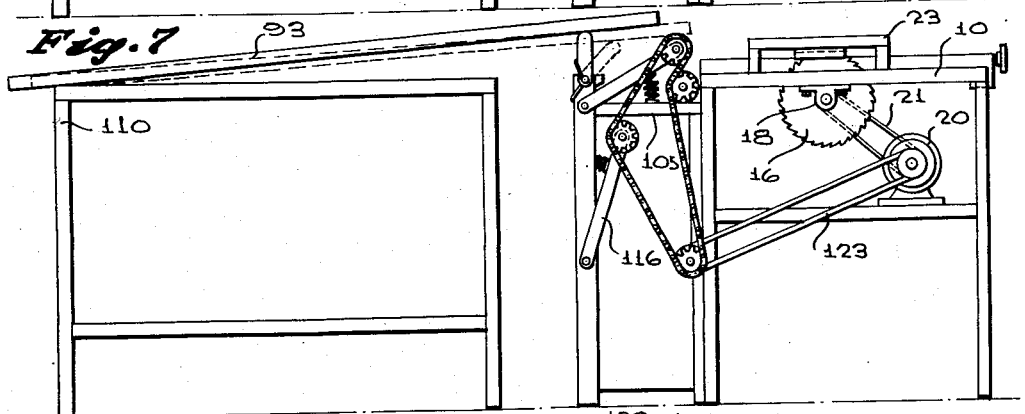
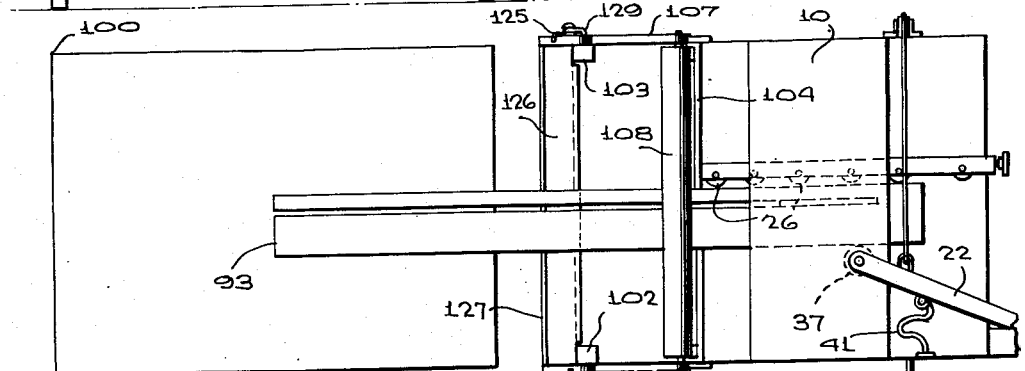
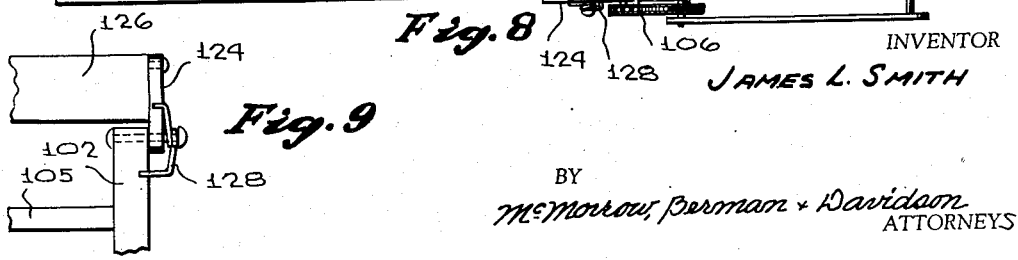
INVENTOR
JAMES L. SMITH
BY
McMorrow, Berman & Davidson
ATTORNEYS Patented Feb. 16, 1954

2,669,263

UNITED STATES PATENT OFFICE 2,669,263

WORK RETURN MECHANISM FOR RIP SAWS

James L. Smith, Charlotte, N. C.

Application December 21, 1951, Serial No. 262,783

3 Claims. (Cl. 143—157)

This invention relates to work return mechanisms for devices, such as rip saws, and more particularly to a work return mechanism positioned to receive work pieces after they have passed through the device and return such work pieces to a position convenient to the operator at the feed end of the device.

It is among the objects of the invention to provide an improved mechanism for returning work pieces from the discharge end to the feed end of a device, such as a rip saw, and to provide additional means for insuring the proper travel of the work pieces, such as boards, through the rip saw; which mechanism can be easily attached to an existing rip saw with no material modification of the rip saw construction and can be powered by the rip saw motor or by a separate motor, as may be desired; which returns all pieces of a ripped board to the operator at a location above that at which the boards are fed to the saw, so that the pieces can be easily disposed of by the operator; which eliminates the necessity of employing an additional workman at the discharge end of the saw; and which is simple and durable in construction, economical to manufacture, easy to install, and positive and effective in operation.

Other objects and advantages will become apparent from a consideration of the following description and the appended claims in conjunction with the accompanying drawings wherein:

Figure 1 is a side elevational view of a rip saw and work return mechanism illustrative of the invention;

Figure 2 is a top plan view of the rip saw and work return mechanism illustrated in Figure 1;

Figure 3 is a cross sectional view on the line 3—3 of Figure 2;

Figure 4 is a cross sectional view on the line 4—4 of Figure 1;

Figure 5 is a cross sectional view on the line 5—5 of Figure 3;

Figure 6 is a side elevational view of a somewhat modified form of rip saw and work return mechanism combination;

Figure 7 is a view similar to Figure 6, but showing the parts in a different operative position from that shown in Figure 6;

Figure 8 is a top plan view of the rip saw and work return mechanism illustrated in Figures 6 and 7; and Figure 9 is a fragmentary end elevational view showing a constructional detail of the work return mechanism illustrated in Figures 6, 7 and 8.

With continued reference to the drawings, the rip saw comprises a flat table 10 supported on upright legs 11, 12, 13 and 14, held in substantially parallel relationship to each other by a platform 15 disposed below and substantially parallel to the table 10 and secured at its corners to the table supporting legs.

The legs 12 and 14 are disposed at the feed end, and the legs 11 and 13 at the discharge end of the rip saw and the work return mechanism, presently to be described, is disposed at the discharge end of the rip saw with its front end adjacent the legs 11 and 13.

A saw 16 is mounted on a saw arbor 17 journaled at its ends in bearings 18 depending from the under side of the table and the saw extends through a saw slot or throat 19 in the table in a manner well known to the art. A motor 20 is mounted on the platform 15 and connected to the saw by a suitable belt or chain 21 to drive the saw, and a rip fence or gauge 22 and a guard 23 are mounted on the saw table.

The rip gauge 22 is an elongated bar, preferably of channel shaped cross section, adjustably secured at one end to the table at the feed end of the latter by suitable means, such as the set screw 25, and extends longitudinally of the table past the saw 16 at selected distances from one side of the saw depending on the width of the pieces which it is desired to rip from wider work pieces by the rip saw.

A plurality of rollers 26 are journaled in the rip fence 22 and project from the side thereof adjacent the saw to facilitate the guiding of work pieces past the saw by the fence.

The guard 23 comprises a flat plate 29 of rectangular shape extending transversely of the table 10 above and substantially parallel to the latter and supported at its ends by end plates 30 and 31, the lower edges of which are secured to the saw table, one at each side edge of the latter and the upper edges of which are secured to the plate 29 at the respectively opposite ends thereof. The plate 29 extends above the saw 16 and is provided intermediate its length with a block 32 secured to the under side of the plate 29 and having in its lower side a longitudinally extending groove which receives the top portion of the saw, so that boards fed past the saw cannot be raised by the action of the saw to a position at which they are not cut entirely through by the upper portion of the saw.

One or more detents 33 are pivotally mounted on the plate 29 at the edge of the plate disposed at the discharge side of the saw 16 and these detents depend from the adjacent edge of the guard plate to engage boards fed past the saw and hold such boards against any return movement, particularly in the event of the saw catching or binding in the boards.

An arm 35 is pivotally mounted at one end to the outer end of an extension 36 which projects outwardly from the feed end of the saw table at the side of the saw remote from the rip fence 22 and a roller 37 is journaled on the arm 35 at the other end of the latter to bear against one edge of a board or plank, the other edge of which is in engagement with the rollers 26 of the rip fence to hold the boards securely against the rip fence. A flexible cable 38 is secured at one end to the arm 35 intermediate the length of the latter and is carried over a sheave 39 mounted on the side edge of the table adjacent the rip fence 22 and depends from the sheave. A weight 40 is secured to the other end of the cable 38 to apply a constant pressure to the roller 37 and maintain the work piece firmly in contact with the rollers of the rip fence. A flexible strand 41 is connected between the arm 35 and the saw table at the side of the saw table remote from sheave 39 to limit movements of the arm 35 toward rip fence 22 and stop the arm before roller 37 is moved past the saw and into engagement with the rip fence 22.

The work supporting and return mechanism disposed at the discharge side of the saw includes a rectangular frame having legs 42 and 43 disposed adjacent the legs 11 and 13 respectively, and legs 44 and 45 spaced from the legs 42 and 43 in a direction away from the rip saw and disposed substantially parallel to the legs 42 and 43.

A roller 47 is disposed between the legs 44 and 45 adjacent the upper ends of these legs and is journaled on the legs by stub axles or arbors 48 and 49 extending one from each end of the roller through suitable bearing apertures in the legs.

Frame side members 50 and 51 are disposed at the outer sides of the legs 44 and 45 respectively, and are pivotally mounted intermediate their lengths on the arbors 48 and 49.

The bars 50 and 51 are pivotally mounted on the arbors 48 and 49 adjacent to, but spaced from their ends adjacent the saw table 10 by depending bearings, one of which is illustrated in Figure 1, and indicated at 52. The two bars have their longitudinal center lines substantially in a common, transversely horizontal plane and are inclined downwardly from their ends adjacent the saw table to their ends remote from the saw table. These bars carry additional depending bearings and a roller 53 is journaled in depending bearings, as indicated at 54, at the ends of the bars or side frame members 50 and 51 adjacent the discharge end of the saw table 10, this roller 53 constituting a feed roller in a manner to be later described.

A roller 55 is disposed between the guide frame members 50 and 51 at the ends of the latter remote from the saw table and journaled in depending bearings 56 secured by the side frame members and a roller 57 is disposed between the side frame members in the space between the rollers 47 and 55 and journaled at its ends in depending bearings 58 also carried by the side frame members.

A horizontally disposed frame top structure 60 extends between the legs 42, 43, 44 and 45 just below the level of the saw table 10 and is horizontally disposed. A roller 61 is journaled at its ends on the frame structure 60 adjacent the discharge end of the saw table and immediately below the roller 53 and constitutes a complementary feed roller. The top surface of the roller 61 is slightly above the horizontal plane of the top of the saw table 10 and the two rollers 53 and 61 are slightly spaced from the discharge end of the saw table.

Tension springs, as indicated at 62 and 63, are connected between the side frame members 50 and 51 and the horizontal frame structure 60 and resiliently urge the roller 53 downwardly toward the roller 61. Elongated set screws 65 and 66 are threaded through tapped holes in the side frame members 50 and 51 respectively, and bear at their lower ends against the upper side of the frame structure 60 to provide adjustable limit stops for the springs 62 and 63 and select the minimum distance between the feed rollers 53 and 61.

An arm 68 is pivotally mounted at one end on the leg 44 near the lower end of the latter and extends from the leg 44 past the leg 42 of the frame of the work return mechanism. A shaft 69 extends transversely through and is journaled in the arm 68 near the free end of this arm and chain sprockets 70 and 71 are mounted on the shaft 69, one near each end of the shaft. A drive motor 72 is supported adjacent the leg 44 with the axis of its shaft substantially coincident with the axis of the pivotal connection between the arm 68 and the leg 44 and a chain 73 drivingly connects the motor 72 with the sprocket 71 and shaft 69. A tension spring 74 is connected between the arm 68 intermediate the length thereof and the base structure 75 of the work return mechanism frame and resiliently urges the shaft 69 and sprockets 70 and 71 downwardly.

Chain sprockets 77 and 78 are mounted on the arbors of the rollers 53 and 61 respectively, substantially in alignment with each other and with the sprocket 70, and a chain sprocket 79 is mounted on the arbor 48 of the roller 47 at the outer side of the frame member 50 in alignment with the sprockets 77 and 78.

A chain 90 extends around the sprocket 70, over the sprockets 77 and 78 and around the sprocket 79 drivingly connecting the shaft 69 to the rollers 47, 61 and 53.

An additional chain sprocket 80 is mounted on the arbor 48 at the outer side of the sprocket 79, sprockets 81 and 82 are mounted on the arbor 83 of the roller 57 at the outer side of the bar 50, and a sprocket 84 is mounted on the arbor 85 of the roller 55 also at the outer side of the bar 50. A chain 86 connects the sprockets 80 and 82 and a chain 87 connects the sprockets 81 and 84, so that all of the rollers 61, 53, 47, 57 and 55 are simultaneously driven by the motor 72 through the shaft 69.

With this arrangement, when a board, as indicated at 93, is disposed with one edge against the rollers 26 of the rip fence 22 and directed toward the saw 16, when this board is moved to and past the saw, its end first engaged by the saw will move between the feed rollers 53 and 61 and be grasped by these rollers and the remainder of the board will then be pulled past the saw. The distance from the feed rollers to the roller 47 is less than one half the length of the shortest board which it is contemplated will be operated by the device, and as soon as the end of the board which is last to pass the saw passes the feed rollers 53 and 61, the board tilts down and comes to rest upon the rollers 47, 57 and 55. These rollers then move the board up the incline of the frame members 50 and 51 and onto the top of the upper feed roller 53 which then moves the board longitudinally until it extends over and eventually comes to rest upon the top of the guard 23 when its mid-length location passes the roller 53. Thus, the board, after passing the saw and through the feed rollers, is returned to a location above and adjacent the location from which it was initially fed to the saw.

A support 95 in the form of a narrow platform is disposed above and substantially parallel to the frame structure 60 and in alignment with the saw 16 to support the boards between the feed rollers 53 and 61 and the roller 47, and a guide 96 is adjustably mounted at the table side of the roller 53 remote from the adjacent edge of the saw table and is aligned with the rip fence or gauge 22 to assist in guiding the boards as they leave the saw.

If desired, a deflector 93, in the form of a narrow plate, is mounted on the upper surface of the top plate 29 of the guard and extends diagonally across the plate 28, so that the forward ends of boards being returned by the work return mechanism will strike this plate and be deflected to one side or the other of the rip saw away from the position of the operator feeding boards into the saw. Such a deflector protects the operator from injury by the returning work pieces and also facilitates the disposal of the finished work pieces by the operator.

In the arrangement illustrated in Figures 6, 7, 8 and 9, the rip saw is substantially the same as that illustrated in Figures 1 to 5 inclusive and described above. In the modified arrangement of Figures 6 to 9, inclusive, however, a flat top table 100 is so located that one end thereof is spaced from the discharge end of the rip saw and a narrow frame including front legs, as indicated at 101, and rear legs, as indicated at 102 and 103, are disposed between the table 100 and the rip saw and against the discharge end of the rip saw.

In this arrangement, a lower feed roller 104 is journaled at its ends on the frame at the rear or discharge end of the saw table 10 and the frame is provided with a horizontal top structure 105 disposed immediately below this lower feed roller.

Arms or side members 106 and 107 are pivotally connected, one at each end, to the rear legs 102 and 103 near the upper ends of these legs and an upper feed roller 108 is disposed between the free ends of the arms 106 and 107 and journaled thereon by suitable arbors projecting from the ends of the roller through bearing apertures in the arms. Chain sprockets 109 and 110 are mounted on the arbors of the rollers 104 and 108 respectively, at one side of the narrow frame and in alignment with each other and an axle 111 is journaled on a bracket 112 carried by the rear leg 11 of the saw and the adjacent front leg 101 of the frame. A chain sprocket 114 is mounted on the axle 111 and a chain 115 extends around the sprockets 114 and 110 and over the sprocket 109.

An arm 116 is pivotally mounted at one end on the rear frame leg 102 and carries at its upper end an idler sprocket 117 which engages the inner side of the chain. A tension spring 118 is connected between the frame leg 102 and the arm 116 to render the arm 116 and the sprocket 117 a chain tightener.

Tension springs, as indicated at 119, are connected between the arms 106 and 107 and the frame structure 105 to resiliently urge the top feed roller 108 toward the bottom feed roller 104, and if desired, set screws may be carried by the arms 106 and 107, as described above, to adjustably control the minimum distance between the feed rollers.

A belt pulley 120 is mounted on the axle 11 and connected by a belt 123 with an additional belt pulley on the shaft of the saw driving motor 16.

With this arrangement, when the saw is in operation the feed rollers 108 and 104 are driven and when an end of a board moves past the saw and between these rollers, the feed rollers engage the board and pull it the remaining distance past the saw.

Arms 124 and 125 are pivotally mounted, each at one end on the rear legs 102 and 103 of the auxiliary frame above the pivotal connections between these legs and the arms 106 and 107 and a member 126 of rectangular shape is disposed between and secured to the arms 124 and 125 at the free ends of the latter and has its upper edge at the outer ends of arms 124 and 125 and its lower edge adjacent the plane of the saw table 10. Friction means 127, such as teeth or a rubber strip, is provided along the upper edge of member 126 to engage the lumber and return it to the upper side of the feed roller.

Looped torsion springs 128 and 129 are disposed with their loops surrounding the pivot bolts connecting the arms 124 and 125 to the legs 102 and 103 and each of these springs has one end engaged with the corresponding leg and the other end engaged with the corresponding arm 124 or 125, the force of the spring being exerted to raise the member 126 and move it toward the top feed roller 108.

It is to be noted that the frame side members 50 and 51 having rotatable rollers 55 and 57 disposed transversely thereof or the arms 106 and 107 having the member 26 disposed transversely thereof, each constitutes a work supporting and return mechanism including spaced side members having a movable contact element disposed transversely thereof. It is also to be understood that the work supporting and return mechanism including the frame side members 50 and 51 with the rotatable rollers 55 and 57 is pivotally mounted on the table 10 for movement about a horizontal axis transverse of the table as by the stub shafts 48 and 49, and that the work supporting and return mechanism including the arms 106 and 107 and the member 26 is likewise pivotally mounted on the table 10 for movement about a horizontal axis transverse of the table as by the pivotal connection to the rear legs 102 and 103.

As the front end of a board passes between the feed rollers it strikes the member 126 and moves this member downwardly and rearwardly. As the front end of the board moves away from the feed rollers, it comes to rest upon the top of the table 100 and when the rear end of the board passes from between the feed rollers, the downward pressure exerted by the board and the feed rollers on the member 126 is substantially released and the springs 128 and 129 then force the member 126 upwardly and forwardly, so that the top edge of the member first rises somewhat above the top surface of the upper feed roller 108 and then drops below the top level of this feed roller, moving the rear end of the board upwardly and forwardly and onto the top surface of the upper feed roller 108 which then moves the board back across the top of the guard 23 toward the location from which the board was originally fed to the saw. When the mid-length location of the board passes the upper feed roller 108, the board tilts downwardly and comes to rest upon the top plate of the guard from which position it can be easily disposed of by the operator of the saw.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a machine including a table, an implement operating adjacent said table, and a gauge for guiding elongated work pieces past said implement, feed rollers disposed one above the other at the discharge side of said implement for engaging work pieces and pulling the work pieces past said implement, and a work supporting and return mechanism having spaced side members with a movable contact element disposed transversely thereof arranged longitudinally of said table at the side of said feed rollers remote from said implement and pivotally mounted on said table for movement about a horizontal axis transverse of said table for receiving a work piece from said feed rollers and returning the work piece to a position at which the end portion thereof adjacent said feed rollers is supported on the upper feed roller, said upper feed roller being then effective to return the work piece to a location adjacent that at which the work piece was initially engaged by said feed rollers.

2. In combination with a rip saw having a saw table provided with a saw throat, a saw journaled below said table and extending through said throat, mechanism for moving elongated work pieces past said saw and returning the work pieces to a location adjacent that from which they were initially fed to said saw comprising a frame disposed at the discharge end of said saw table, a lower feed roller journaled on said frame, an upper feed roller disposed above said lower feed roller, means pivotally mounted on said frame supporting said upper feed roller for movement toward and away from said lower feed roller, power means drivingly connected to said feed rollers, and a work supporting and return mechanism having spaced side members with a movable contact element disposed transversely thereof arranged longitudinally of said saw table at the side of said feed rollers remote from said saw table and pivotally mounted on said saw table for movement about a horizontal axis transverse of said saw table to engage a work piece discharged by said feed rollers and place the end of such work piece adjacent said feed rollers on the top of said upper feed roller for return by the latter toward the feed end of said saw table.

3. In combination with a rip saw having a saw table provided with a saw throat, a saw journaled at the under side of said table and projecting upwardly through said throat, and a guard mounted on said table and overlying said saw, mechanism for moving elongated work pieces past said saw and returning said work pieces to the top of said guard comprising a frame disposed adjacent the discharge end of said saw table, a lower feed roller journaled on said frame, an upper feed roller disposed above said lower feed roller, means pivotally mounted on said frame supporting said upper feed roller for movement toward and away from said lower feed roller, spring means connected between the upper feed roller supporting means and said frame resiliently urging said upper feed roller toward said lower feed roller, means drivingly connected to said feed rollers, and a work supporting and return mechanism having spaced side members with a movable element disposed transversely thereof arranged longitudinally of said saw table at the side of said feed rollers remote from said saw table and pivotally mounted on said saw table for movement about a horizontal axis transverse of said saw table for receiving work pieces discharged by said feed rollers and returning such work pieces to the top of said upper feed roller for movement thereby onto said guard.

JAMES L. SMITH.

References Cited in the file of this patent

UNITED STATES PATENTS

| Number | Name | Date |
|---|---|---|
| 13,354 | Hull | July 31, 1855 |
| 112,861 | Sprague | Mar. 21, 1871 |
| 137,284 | Benjamin | Apr. 1, 1873 |
| 140,570 | Appleton | July 8, 1873 |
| 155,384 | Pennock | Sept. 29, 1874 |
| 364,693 | Webb | June 14, 1887 |
| 604,661 | Johnston et al. | May 24, 1898 |
| 922,854 | Cleveland | May 25, 1909 |
| 1,132,840 | Garrett | Mar. 23, 1915 |
| 1,618,954 | Boscarelli | Feb. 22, 1927 |
| 1,796,745 | Buccicone | Mar. 17, 1931 |
| 1,803,857 | Lumb | May 5, 1931 |
| 2,267,937 | Mattison | Dec. 30, 1941 |
| 2,353,239 | Horstkotte | July 11, 1944 |

FOREIGN PATENTS

| Number | Country | Date |
|---|---|---|
| 90,820 | Sweden | Nov. 16, 1937 |
| 66,561 | Denmark | Apr. 5, 1948 |